(12) United States Patent
Bauer

(10) Patent No.: US 9,732,725 B2
(45) Date of Patent: Aug. 15, 2017

(54) AUTOMATIC HEIGHT ADJUSTING PADDLE WHEEL

(71) Applicant: Jerome A. Bauer, Brunswick, OH (US)

(72) Inventor: Jerome A. Bauer, Brunswick, OH (US)

(*) Notice: Subject to any disclaimer, the term of this patent is extended or adjusted under 35 U.S.C. 154(b) by 0 days.

(21) Appl. No.: 14/540,146

(22) Filed: Nov. 13, 2014

(65) Prior Publication Data
US 2016/0138559 A1    May 19, 2016

(51) Int. Cl.
  *F03B 15/00* (2006.01)
  *F03B 13/00* (2006.01)
  *F03B 17/06* (2006.01)

(52) U.S. Cl.
  CPC ...... *F03B 17/063* (2013.01); *F05B 2240/916* (2013.01); *F05B 2270/20* (2013.01); *Y02E 10/28* (2013.01)

(58) Field of Classification Search
  CPC .............................. F03B 17/063; Y02E 10/28
  USPC ...................................... 290/43, 54
  See application file for complete search history.

(56) References Cited

U.S. PATENT DOCUMENTS

| | | | | |
|---|---|---|---|---|
| 4,270,056 A | * | 5/1981 | Wright | F03B 17/063 290/54 |
| 4,717,831 A | * | 1/1988 | Kikuchi | F03B 13/184 290/53 |
| 4,843,249 A | * | 6/1989 | Bussiere | F03B 13/183 290/42 |
| 5,440,175 A | * | 8/1995 | Mayo, Jr. | F03B 7/003 290/53 |
| 5,882,143 A | * | 3/1999 | Williams, Jr. | E02B 9/00 290/53 |
| 6,208,037 B1 | * | 3/2001 | Mayo, Jr. | E02B 9/00 290/42 |
| 6,534,881 B1 | * | 3/2003 | Slavchev | F03B 17/02 290/53 |
| 2008/0219764 A1 | * | 9/2008 | Prem | G01B 11/306 404/72 |

\* cited by examiner

*Primary Examiner* — Viet Nguyen
(74) *Attorney, Agent, or Firm* — The Law Office of Jerry D. Haynes

(57) ABSTRACT

An automatic height adjusting paddle wheel comprising a housing, where the housing includes a pair of side portions; a paddle wheel positioned along a shaft within the housing; a pair of hoists attached to shaft on each side of the paddle wheel, where each hoists includes a cable coupled to a top portion of the housing; a means to detect a water level fastened to the cable within the hoists, where the means to detect the water level activates the hoists to lift the shaft as the water level raises and lowers in turn raising and lowering the paddle wheel; and a generator at each end of the shaft, where the generator produces electric power as the paddle wheel rotates within the water.

6 Claims, 3 Drawing Sheets

AUTOMATIC HEIGHT ADJUSTING PADDLE WHEEL

BACKGROUND OF THE INVENTION

Field of the Invention

The present invention relates to a paddle wheel generator that automatically adjusts to the rise and fall of the river water level.

Description of Related Art

Recently, there has been a drive to find alternative fuel sources to cut or eliminate our dependence on fossil fuels. Fossil fuels are prone to pollution and have a finite amount. To deter dependence on fossil fuels, hydroelectric power is an alternative option. Hydroelectric power is a technology which harnesses flowing or falling water to generate electrical power. An established type of hydroelectric power is a paddle wheel or water wheel machine, where a rotating wheel is positioned within a river to convert the river's flow into electrical power. The paddle wheels were commonly used at four mills, paper mills, machining ore and manufacturing cloth.

Today most water wheels are not in use because of the availability of consistent water sources. Because of the dependence on water the paddle wheel can only be set up in areas large enough and with enough steady water to support the large wheel. Additionally, the type of water is specific to provide continuous flow. Areas prone to freezing cannot be used because this will stop the rotation of the wheel when the river freezes. Finally, unless the water source is very deep it will fluctuate depending on rainfall and time of year. With raising and lowering water levels the paddle wheel is hindered thus slowing the speed and amount that the wheel will rotate.

Therefore, it would be beneficial in the art to provide a paddle wheel that continuously works in varying water levels. It would also be desirable in the art to provide a paddle wheel operates in varying weather conditions.

SUMMARY OF THE INVENTION

In view of the foregoing disadvantages inherent in the prior art, the general purpose of the present invention is to provide an automatic height adjusting paddle wheel, configured to include all of the advantages of the prior art, and to overcome the drawbacks inherent therein.

Accordingly, an object of the present invention is to provide an automatic height adjusting paddle wheel to enable power generation even as the water levels fluctuate.

Another object of the present invention is to provide an automatic height adjusting paddle wheel with a pair of floats which allow the paddle wheel to self-regulate the height of the wheel on the water.

Yet another object of the present invention is to provide an automatic height adjusting paddle wheel with a narrow wheel that shifts along a shaft within the housing, where the narrow wheel is operational in rivers prone to freezing.

To achieve the above objects, in an aspect of the present invention, an automatic height adjusting paddle wheel is described comprising a housing, where the housing includes a pair of side portions; a paddle wheel positioned along a shaft within the housing; a pair of hoists attached to shaft on each side of the paddle wheel, where each hoists includes a cable coupled to a top portion of the housing; a means to detect a water level fastened to the cable within the hoists, where the means to detect the water level activates the hoists to lift the shaft as the water level raises and lowers in turn raising and lowering the paddle wheel; and a generator at each end of the shaft, where the generator produces electric power as the paddle wheel rotates within the water.

These together with other aspects of the present invention, along with the various features of novelty that characterize the present invention, are pointed out with particularity in the claims annexed hereto and form a part of this present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

Like reference numerals refer to like parts throughout the description of several views of the drawings.

DETAILED DESCRIPTION OF THE DRAWINGS

The present invention relates to a paddle wheel generator that automatically adjusts to the rise and fall of the river water level. The present invention provides an automatic height adjusting paddle wheel to provide a device which facilitates the process of generating electric power. The automatic height adjusting paddle wheel includes a supported paddle wheel coupled to a pair of float on each side. The floats rest atop the top of the water's surface and the housing supporting the floats and the paddle wheel adjust the level of the paddle wheel as the floats rise and fall atop the water. This way the paddle wheel is consistently at the optimal height to produce the most power for the supported generators.

Figure 1:
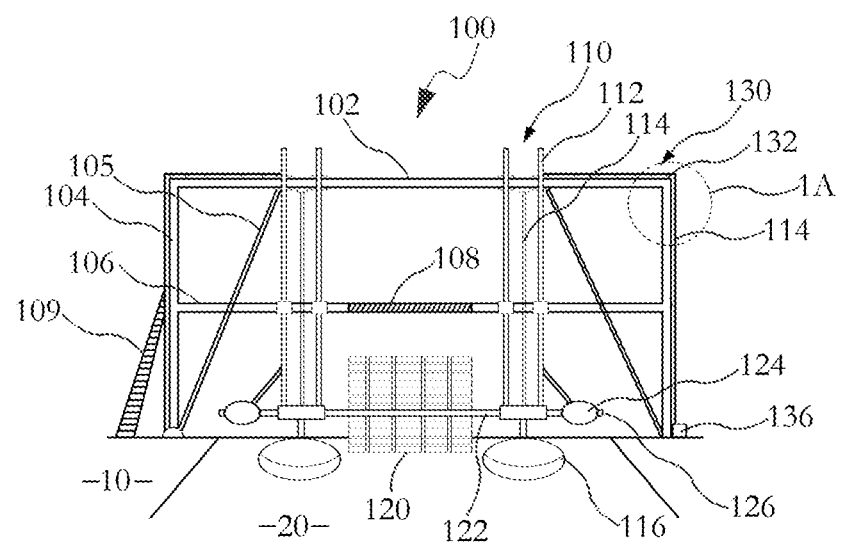
FIG. 1 depicts a perspective view of an automatic height adjusting paddle wheel in accordance with an exemplary embodiment of the present invention.

Turning now descriptively to the drawings, referring to FIG. 1, a perspective view of an automatic height adjusting paddle wheel 100 is shown in accordance with an exemplary embodiment of the present invention. The automatic height adjusting paddle wheel 100 includes a housing 102 with a pair of side portions 104. The housing 102 extends across a body of water or river 20, where each side portion 104 is anchored to the ground on opposing banks 10 of the river 20. Within a middle portion of the housing 102 is a platform 106 which extends along the entire length of the housing 102 between the side portions 104. The platform 106 includes a middle portion 108 which is also a repair platform which enables access below the platform 106 for repairs to an underlying paddle wheel 120 within the housing 102. To access the platform 106 and repair platform 108 a ladder 109 may be positioned against the side portion 104 of the housing 102. This way a repair person can easily traverse the housing 102 as needed for repairs and updates.

Within the frame is a pair of hoists 110 which assists the paddle wheel 120 to raise and lower as the water levels 20 rise and fall. The hoists 110 are supported within the housing 102 with a support beam 105 which extends from the top of the housing 102 to the bottom of the side portion 104. Each hoist 110 includes a track 112 with a central cable 114. The cable 114 is attached to a float 116 which is suspended atop the water 20. The float 116 raises as the water level 20 rises and lowers in like kind. As the float 116 moves the hoist 110 adjusts accordingly to maintain tension and move the paddle wheel 120. The floats 116 may be made from aluminum or plastic so that they are light yet durable for use in any weather conditions.

The paddlewheel 120 is supported on a rotating shaft 122. The shaft 122 is coupled to each hoist 110 to move the paddle wheel 120 as the floats 116 adjust to the water levels 20. At each end of the shaft 122 is a generator 124 followed by a bearing 126. The bearing 126 facilitates the rotating of the shaft 122 and thereby the paddle wheel 120 to ensure continuous movement. The generator 124 produces the power supplied by the rotating paddle wheel 120. By utilizing two generators 124 even more power is able to be produced by the single paddle wheel 120.

Figure 1A:
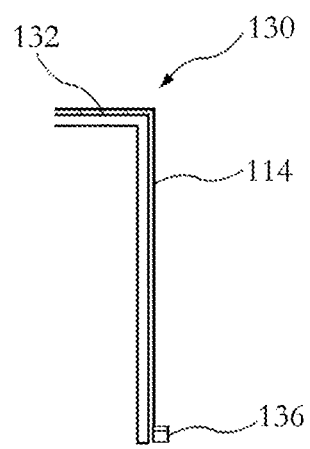
FIG. 1A depicts an isolated view of a side portion of a housing associated with the automatic height adjusting paddle wheel in accordance with an exemplary embodiment of the present invention.

The cable 114 is coupled to a hoist lifting mechanism 130 positioned along the top edges and the side portions 104 of the housing 102. The hoist lifting mechanism 130 includes a set of rollers 132 atop the housing 102, which assists movement of the cable 114. The cable 114 attaches to the float 116 at one end and an anchor 136 at an opposing end. The anchor 136 receives the excess cable 114 to maintain tension on the float 116 as it moves with the height of the water 20. An isolated view of the rollers 132 over the top of one side of the housing 102 is shown in FIG. 1A showing the cable 114 extending to the anchor 136.

Figure 2:
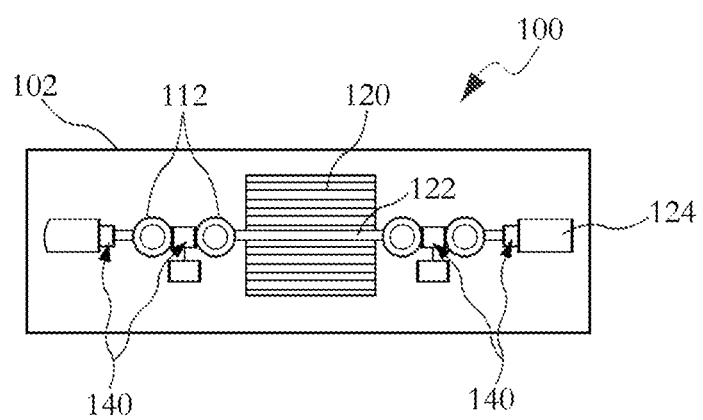
FIG. 2 depicts a top view of the automatic height adjusting paddle wheel in accordance with an exemplary embodiment of the present invention.
Figure 2A:
FIG. 2A depicts a cross-section of roller shaft bearings in accordance with the present invention.

Referring now to FIG. 2, a top view of the automatic height adjusting paddle wheel 100 is shown in accordance with an exemplary embodiment of the present invention. The paddle wheel 120 is positioned within the middle of the housing 102. The shaft 122 is illustrated extending between each generator 124 and passing through the middle of the paddle wheel 120. To promote rotation of the shaft 122 a set of roller shaft bearings 140 are positioned against the generators 124 and within the tracks 112. A cross-section of the roller shaft bearings 140 is illustrated in FIG. 2(A).

Figure 3:
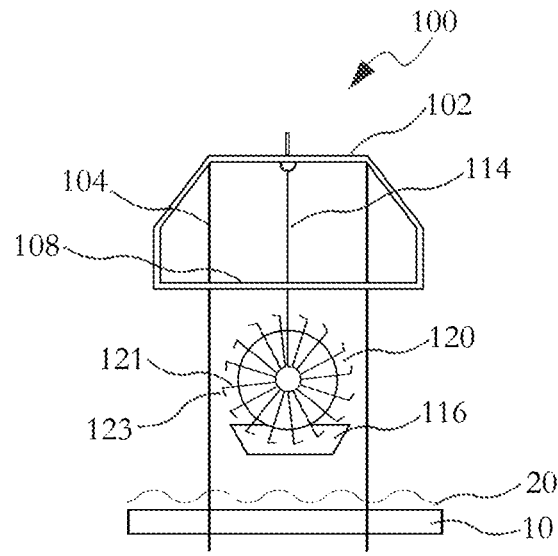
FIG. 3 depicts a side view of the automatic height adjusting paddle wheel in accordance with an exemplary embodiment of the present invention.

Referring to FIG. 3, a side view of the automatic height adjusting paddle wheel 100 is shown in accordance with an exemplary embodiment of the present invention. The side portions 104 are illustrated going into the ground 10 approximately 5-20 feet which provides the stability for the housing 102 to anchor the paddle wheel 120. Within the paddle wheel 120 are a plurality of blades 121, where each blade 121 includes a paddle 123 at the end. The paddle 123 of the blade 121 better propels the paddle wheel 120 than simply a straight blade. This way greater rotation is achieved to create more power from the generators. Additionally, the paddle 123 helps to balance and stabilize the paddle wheel 120 therefore reducing bouncing while the paddle wheel 120 turns.

Figure 4:
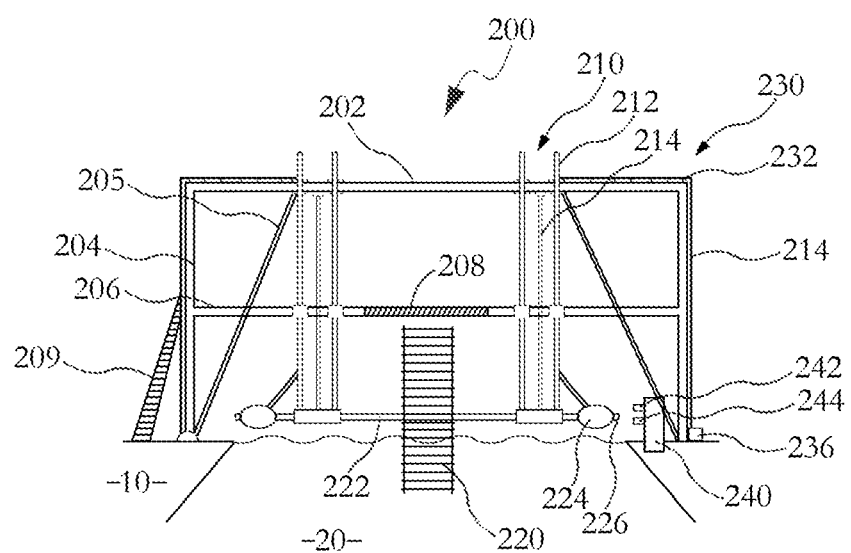
FIG. 4 depicts a perspective view of the automatic height adjusting paddle wheel in accordance with an alternative embodiment of the present invention.

Referring now to FIG. 4, a perspective view of an automatic height adjusting paddle wheel 200 is shown in accordance with an alternative embodiment of the present invention. The height adjusting paddle wheel 200 includes same the housing 202, hoists 210, lifting mechanism 230, shaft 222 and generators 224 as the first embodiment. A narrow paddle wheel 220 is coupled to the shaft 222. The narrow paddle wheel 220 enables use in rivers prone to freezing, because the narrow paddle wheel 220 may be moved along the shaft 222 to unfrozen areas of water 20.

Coupled the hoist 210 is a computer controller 240. The computer controller 240 includes a pair of lasers 242, 244 where a first laser 244 is directed toward the water 20 and a second laser 242 is directed toward the bearing 226 at the end of the generator 224. The second laser 244 detects the height of the water 20 to thereby direct the motor 234 within the hoist 210 to lift the paddle wheel 220 to an optimal height. With the computer controller 240 the paddle wheel 220 is operational without the floats.

With the automatic height adjusting paddle wheel power is generated automatically without interruption. A series of automatic height adjusting paddle wheels may be positioned in a row along a river to provide great power output for large buildings or even a city or town. Either utilizing the floats or the lasers within the computer controller, the paddle wheel is able to raise and lower as the height of the river changes, so that great amounts of power are continuously converting from the wheel.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

What is claimed is:

1. An automatic height adjusting paddle wheel comprising:
    a. a housing, where the housing includes a pair of side portions;
    b. a paddle wheel positioned along a shaft within the housing;
    c. a pair of hoists attached to the shaft on each side of the paddle wheel, where each hoists includes a cable coupled to a top portion of the housing, where the pair of hoists are supported with a support beam which extends from the top of the housing to the bottom of the side portion;
    d. a means to detect a water level fastened to the cable within the hoists, where the means to detect the water level activate the hoists to lift the shaft as the water level raises and lowers in turn raising and lowering the paddle wheel, wherein the means to detect a water level is attached at one end of the cable and an anchor is attached at an opposing end of the cable;
    e. a generator at each end of the shaft, where the generator produces electric power as the paddle wheel rotates within the water;
    f. a platform within a middle portion of the housing, where the platform extends along the entire length of the housing between the pair of side portions and above the paddle wheel, wherein the platform enables access to the paddle wheel; and g. a hoist lifting mechanism positioned along the top edges and side portions of the housing and includes a set of rollers atop the housing, which assists in movement of the cable associated with each hoist.

2. The automatic height adjusting paddle wheel according to claim 1, where the means to detect the water level is a float at attached to the cable at a bottom of each hoist, where the cable moves the shaft along a track as the float moves atop the water.

3. The automatic height adjusting paddle wheel according to claim 1, where the means to detect the water level is a computer controller coupled to the hoist, where the computer controller includes a pair of lasers, where a first laser detects the water level to power a motor within the hoist to lift the shaft, and a second laser detects the height of the generator to position the paddle wheel at an optimal height.

4. The automatic height adjusting paddle wheel according to claim 1, where the shaft includes a set of roller shaft bearings to facilitate rotating the shaft as the paddle wheel turns.

5. The automatic height adjusting paddle wheel according to claim 1, where the paddle wheel includes a plurality of blades, where each blade includes a paddle to stabilize the paddle wheel as it rotates.

6. The automatic height adjusting paddle wheel according to claim 1, where the side portions of the housing are driven into the ground to stabilize the housing.

\* \* \* \* \*